United States Patent
Dahl et al.

(10) Patent No.: US 6,266,747 B1
(45) Date of Patent: Jul. 24, 2001

(54) METHOD FOR WRITING DATA INTO DATA STORAGE UNITS

(75) Inventors: Orvar Per Dahl, Stockholm; Matiss Jonas Zervens, Järfälla, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/182,867

(22) Filed: Oct. 30, 1998

(51) Int. Cl.[7] .................................................. G06F 12/00
(52) U.S. Cl. ............................ 711/154; 711/201; 711/220
(58) Field of Search .................................. 711/154, 118, 711/168, 201, 220; 712/223; 345/130; 710/52; 365/189.04

(56) References Cited

U.S. PATENT DOCUMENTS

| | | | |
|---|---|---|---|
| 4,520,439 | * 5/1985 | Liepa | 711/201 |
| 4,750,154 | 6/1988 | Lefsky et al. | 365/189.04 |
| 4,868,553 | * 9/1989 | Kawamata | 345/130 |
| 5,488,709 | * 1/1996 | Chan | 711/118 |
| 5,590,348 | * 12/1996 | Phillips et al. | 712/223 |
| 5,592,684 | 1/1997 | Gaskins et al. | 710/52 |
| 5,745,732 | * 4/1998 | Cherukuri et al. | 711/168 |

FOREIGN PATENT DOCUMENTS 0651331A   5/1995   (EP) .

OTHER PUBLICATIONS

"Gathering Store Instructions in a Superscaler Processor" IBM Technical Disclosure Bulletin, vol. 39, No. 9, Sep. 1996, pp. 103–105.

* cited by examiner

Primary Examiner—Do Hyun Yoo
Assistant Examiner—Nasser Moazzami
(74) Attorney, Agent, or Firm—Burns, Doane, Swecker & Mathis, L.L.P.

(57) ABSTRACT

A computer system merges data variables to be written into the same memory address. The data variables are merged by generating mask bits corresponding to the positions of the data variables within an addressable memory location. The data variables and the mask bits are merged as long as a condition for not merging the data variable is satisfied. For example, the data to be written is directed to a different address or if a read request becomes dependent on a pending write request, a write memory cycle is initiated to write the merged data into the memory.

6 Claims, 2 Drawing Sheets

US 6,266,747 B1

METHOD FOR WRITING DATA INTO DATA STORAGE UNITS

TECHNICAL FIELD

This disclosure relates to the field of computer systems and more particularly to a method of writing data into data storage units in such computer systems.

BACKGROUND

Under a typical computer system architecture, during read and write cycles, a data storage controller (DSC) controls access to data storage units (DSUs) that comprise system memory with addressable memory locations, which are generally within a continuous range of predefined logical addresses. For accessing the system memory, the DSC processes read and write requests generated by an instruction processing unit (IPU) executing a program that requests data to be read from or written into a particular memory location. Upon receipt of the requests, the DSC initiates corresponding read or write cycles over a memory bus, for accessing the addressed memory locations. The rate by which data is transferred, i.e., the data throughput, during each memory cycle is dependent on the bus speed as well as the width of the system's data bus and the length of a memory location, which is defined in terms of data bits, for example, 8-bit, 16-bit, or 32-bit, etc.

Each memory cycle, read or write, expends a certain number of clock cycles. Because the performance of a computer system is highly dependent on the data throughput, it is necessary to maximize the data transfer rate over the memory bus, ideally, making it reach the full system clock speed. Various techniques have been devised to increase the data throughput by minimizing the time required to access the system memory. For example, under an scheme known as interleaved memory access, each DSU is addressable over a corresponding internal bus that has an assigned range of physical addresses. In this way, a memory accesses over one internal bus can start ahead of completion of a prior access over another internal bus, provided that the memory bus bandwidth supports the execution of parallel memory accesses over the internal busses. Usually, under the interleaved memory access arrangement, a separate memory management unit (MMU) maps the logical memory addresses into the physical addresses.

Although the interleaved write scheme improves data throughput for writing into separate physical addresses, sometimes the execution of a program requires writing data to the same address, with each write request sometimes modifying different portions of the memory address. For example, two back-to-back writes to a two-word (32 bits) address location may modify a first nibble (4 bits) in bit positions 0–3, and a third nibble in bit positions 16–19. Under a conventional arrangement two write cycles must be initiated to service the write requests to the same address. It is, however, desired to reduce the number of write cycles to different portions of the same memory address, in order to increase data throughput for accessing the system memory.

SUMMARY OF THE INVENTION

Briefly, the present invention is embodied in a method for writing data variables into a system memory that has addressable memory locations, with each memory location having corresponding memory positions. After the data variables to be written are received, the method of the invention generates mask bits that correspond to the specified memory positions into which the received data variables are to be written. The received data variables and their corresponding mask bits are merged, unless a condition for not merging the data variables is satisfied. If so, then the merged data variables are written into the system memory. The condition for not merging the data variables is satisfied either when a memory address for a current data variable to be written is not the same as that of a previous data variable, or when two successive data variables are to be written into two separate portions of the same memory location for example, an upper 16-portion and a lower 16-bit portion, or when a read request for a data variable from a memory address becomes dependent on a pending write request that writes a data variables into the same memory address.

According to some of the more detailed features of the invention, the data variables are merged based on a predefined bit length format and a data start position within the memory location. In the exemplary embodiment of the invention, the predefined bit length format may specify a data variable as a 1-bit, 2-bit, 4-bit, 16-bit, 32-bit, 64-bit, or 128-bit data variable. Based on the predefined bit length format, a data variable may be written into different memory locations, without being merged with another data variable. For example, a 32-bit data variable is written into the system memory without being merged with another data variable. The 64-bit and 128-bit data variables are fragmented into a corresponding plurality of 32-bit data variables, with each 32-bit variable being written without merging. Under one aspect, the method of the invention generates a mask position field (MPO) defining whether a data variable should be written into a first portion or a second portion of a memory location, for example, the upper or lower 16-bit portions. In this way, by decoding an instruction based on the MPO, a determination is made as to whether a data variable should be written into a lower word of an addressed memory location, an upper word of an addressed memory location, or the entire length of an addressed memory location.

DETAILED DESCRIPTION OF THE PREFERRED EMBODIMENT

Figure 1:
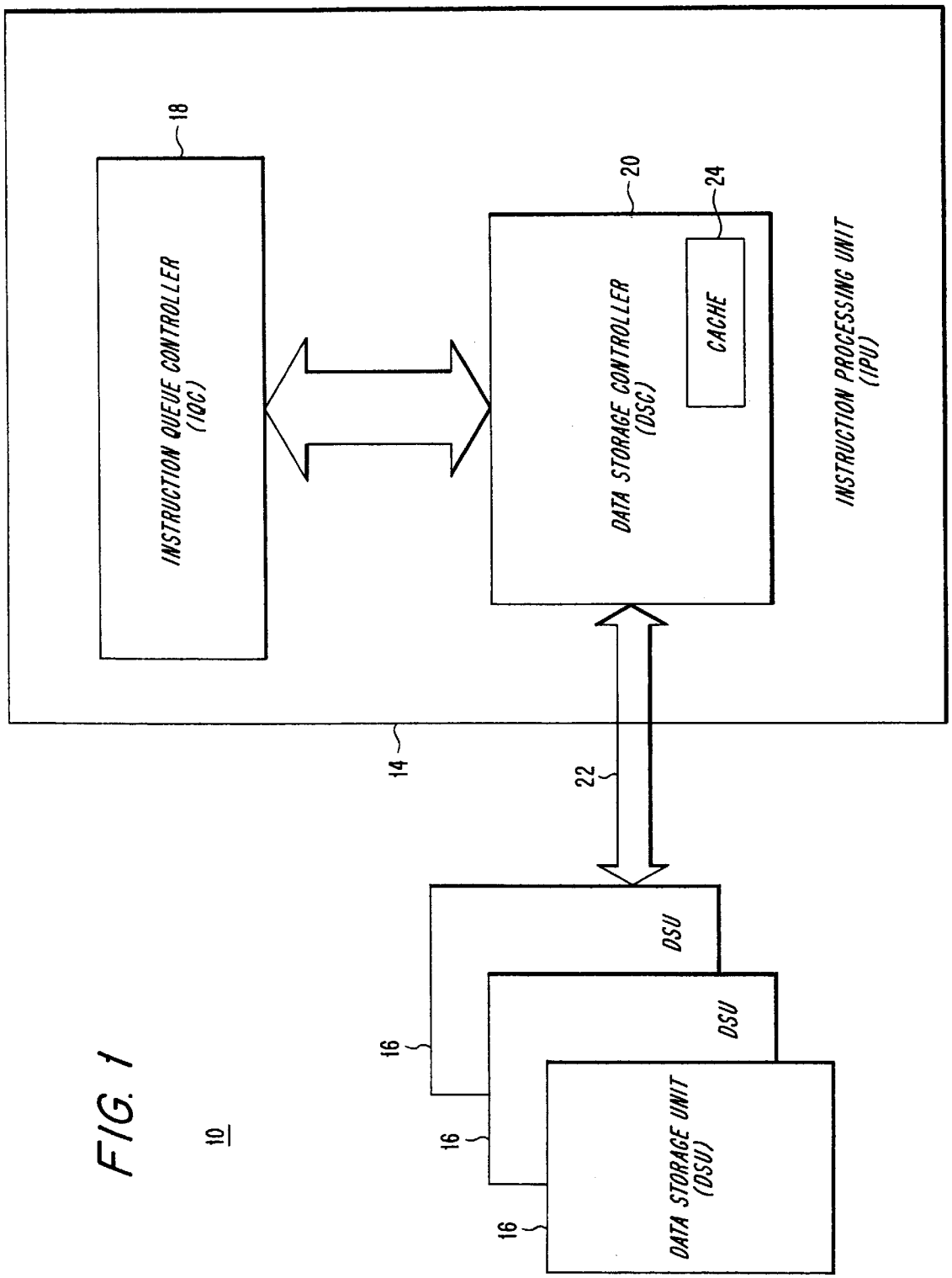
FIG. 1 is a block diagram of a computer system that advantageously incorporates the present invention.

Referring to FIG. 1, a block diagram of a computer system 10 that advantageously incorporates the present invention is shown. In the exemplary embodiment, the computer system 10 is a telephony computer system providing switching control for a public system telephone network (PSTN). In order to provide the required telephony services, the computer system 10 is designed as a read priority system, where the read requests have priority over the write requests. Under the read priority arrangement, situations arise when a read request becomes dependent on a pending write request. In this situation, the pending write request is given priority over the pending read requests.

The system 10 operates under the control of an Instruction Processor Unit (IPU) 14 that exchanges data stored in a plurality of interleaved Data Storage Units (DSU) 16 by executing a program that generates memory access requests, including read requests and write requests. A read request requests data variables or sub-variables from a specified memory location, and a write request modifies data variables or sub-variables in the same memory location. Preferably, the system 10 employs well known pipelining and pre-fetching techniques for executing the IPU instructions. Under the pre-fetching technique, newly arrived instructions are fetched prior to the execution of a previous instruction, thereby increasing execution efficiency. Under the pipeline execution technique, the IPU instructions are subdivided into smaller sub-tasks, with each sub-task being performed by a corresponding register. Accordingly, the computer system 10 uses separate read and write queues, to implement these techniques.

In the exemplary embodiment of the invention, each memory location stores 32 bits of data that are addressable by a 32-bit address. As described above, the interleaved arrangement of the DSUs 16 allows for data access to one DSU to start, while an access to another DSU is continuing. An Instruction Que Controller (IQC) 18 within the IPU is responsible for sequencing the requests and providing them to a Data Storage controller (DSC) 20. The DSC 20 is responsible for generating memory cycles over a memory bus 22.

According to the present invention, the number of write cycles for servicing write requests to different positions of the same memory location are reduced by merging the corresponding data variables and initiating a single write cycle for writing the merged data variables into the system memory. The single write cycle is initiated, after a condition for not merging the data variables is satisfied, for example, when another write request changes the write memory address or when an intervening read request becomes dependent on a still pending write request.

Figure 2:
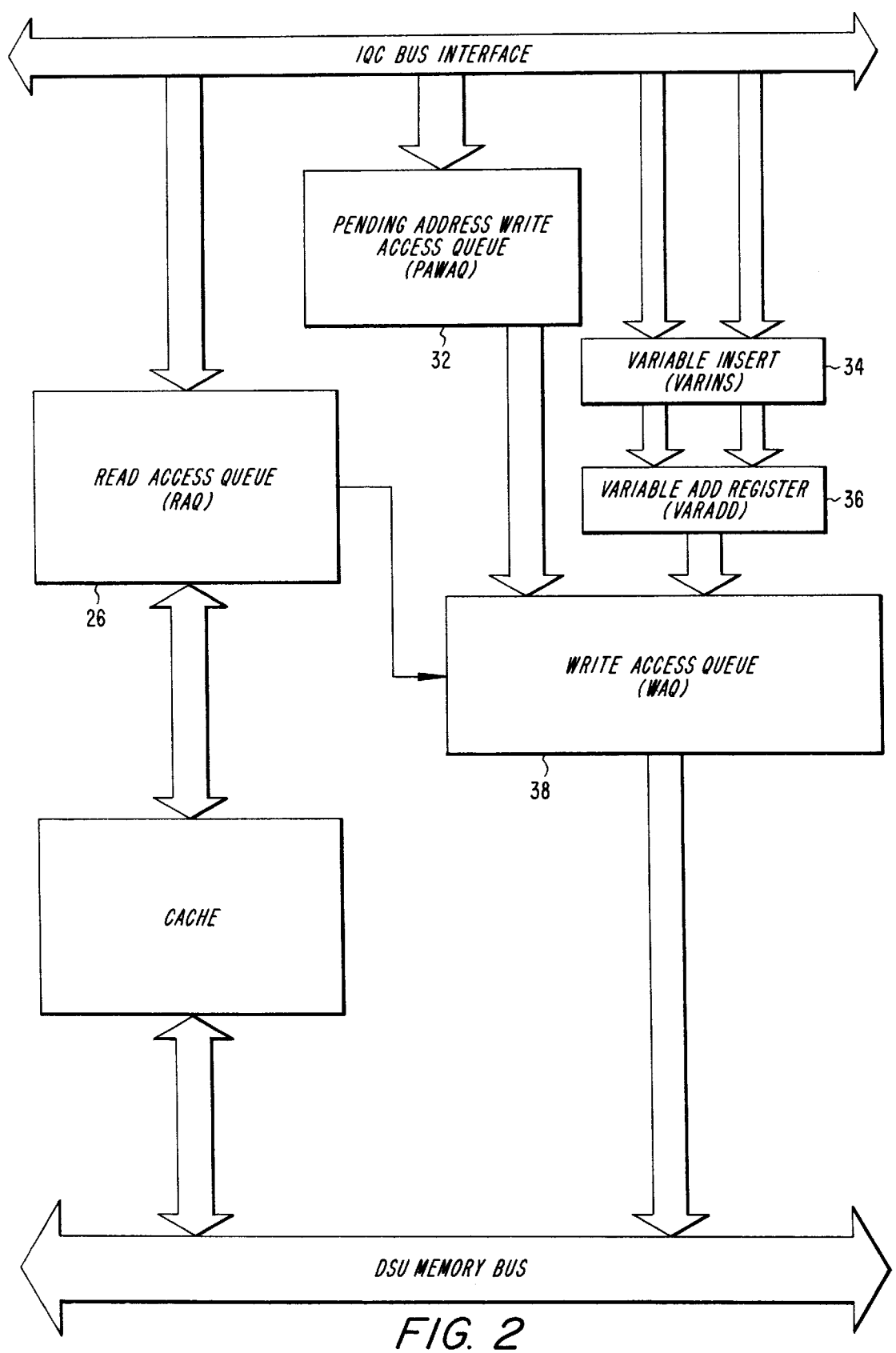
FIG. 2 is a block diagram of a DSC that is incorporated in the computer system of FIG. 1.

Referring to FIG. 2 a block diagram of the DSC 20 of the present invention is shown. For queuing the read requests, the DSC 20 includes a multiple-element Read Access Queue (RAQ) 26 that stores IQC-generated read requests for reading data variables from specified DSU memory locations. For write requests generated by the IQC 18, the DSC 20 includes an 8-element Pending Address to Write Access Queue (PAWAQ) 32. Although in strict order, data variables to be modified may arrive at the DSC 20 concurrently with or after write addresses have arrived at the PAWAQ 32. The address is taken out of the PAWAQ 32, when its associated data variable arrives from the IQC 18. Preferably, the PAWAQ 32 is the same size as an IQC buffer (not shown) that supplies the write requests to prevent queue overflow. It should be noted that the IQC 18 may flush a pending write request in the PAWAQ 32 prior to arrival of its associated data variable.

In the shown embodiment, each element of the PAWAQ 32 has 56 bits, which are defined according to Table 1 below.

TABLE 1

| PAWAQ 32 queue contents | | | | | | | |
|---|---|---|---|---|---|---|---|
| 55–50 | 49 | 48 | 47 | 46–39 | 38–7 | 6–5 | 4–0 |
| PTag | PV | PF | DW | VC | Address | PT | Tag |

The flag is received from the IQC 18 defining a write access sequence number. Address is a write address to a memory location received from the IQC 18 for a corresponding write request sequence number. PTag and PT are internal panic tags in the DSC 20 used for resolving situations when the same tag is in two positions in the access sequences. In the exemplary embodiment, the data variables received from the IQC 18 may have one of the following bit length formats: 1-bit data, 2-bit data, 4-bit data, 8-bit data, 16-bit data, 32-bit data, 64-bit data and 128-bit data format.

The bit length format and data start position is specified by the IQC 18 via a VC flag, which is coded according to Table 2 below.

TABLE 2

| VC Coding | | | |
|---|---|---|---|
| VC bit 7–5 | Length | VC bit 4–0 | Start position |
| 000 | 1 | 11111–00000 | 31 . . . 2, 1, 0 |
| 001 | 2 | 11110–00000 | 30 . . . 4, 2, 0 |
| 010 | 4 | 11100–00000 | 28 . . . 8, 4, 0 |
| 011 | 8 | 11000–00000 | 24, 16, 8, 0 |
| 100 | 16 | 10000–00000 | 16, 0 |
| 101 | 32 | 00000 | 0 |
| 110 | 64 | 00000 | 0 |
| 111 | 128 | 00000 | 0 |

In the exemplary embodiment, the IQC 18 fragments 64-bit and 128-bit data into 2 or 4 32-bit data, respectively, and the DSC 20 handles each 32-bit data transparently. Double-word (DW) flag indicates a condition when an instruction writes the same data to two different memory locations. PA is a Pending Read Flag set by a dependent read in the RAQ 26. The PA flag is used to force write cycles when a read request becomes dependent on a pending write request.

A VARiable INSert (VARINS) function 34 positions data variables in the data word of a specified memory location. In the preferred embodiment of the invention, the VARINS function 34 has a 32-bit register divided into two 16-bit LSB and MSB words. The 16-bit LSB word stores the data variables received from the IQC 18. In response to the VC coding, the VARINS function 34 generates corresponding mask bits in the 16-bit MSB word by setting the corresponding positions of a mask data bit to a 1 binary state. In this way, the data variables are located in the lower and the mask bits are located in the upper portion of the 32 bit register. For example, for writing a "5" (Hex), into memory bit positions 0–3, the DSC 20 sets bits 16–19 of the MSB word by mask bits and places the actual data in bits 0–3 of the LSB word. As a result, the VARINS function 34 would contain "000F-XXX5" (Hex). Similarly, if "3" (Hex), is to be written into memory bit positions 4–7, the DSC 20 places the actual data in bits 4–7 of the LSB word and sets the bits 20–23 of the MSB word by the mask bits. As a result, the VARINS function 34 would contain "00F0-XX3X" (Hex). The VARINS function 34 also generates a mask position field (MPO), which is coded to define whether the VARINS function 34 data should be inserted into the lower or the upper 16-bit positions of the memory location. The VARINS function 34 also generates a mask with '1' in the associated positions and a mask position field, MPO. This allows writing of data variables directly to a DSU 16. Table 3 shows the MPO coding.

TABLE 3

| MPO Coding | |
|---|---|
| MPO[1:0] | Description |
| 00 | Not valid |
| 01 | Variable insertion in LSB (bits 15-0) |
| 10 | Variable insertion in MSB (bits 31-16) |
| 11 | 32 bit variable |

A VARiable ADD (VARADD) register 36 merges a current write data and its corresponding mask bits from the VARINS function 34 with a previous write data and its corresponding mask bits, if the addresses of the current write and previous write are the same. For example, if "3" (Hex) and "5" (Hex) are to be written into memory bit positions 0–3 and 8–12 of the same memory address, respectively, the VARADD register merges these variables to produce "0F0F-X5X3." Under this arrangement, the VARIN function 34 sets the MPO field to "01", indicating that the data variables must be inserted into lower 16 bits of the memory location. If the addresses are not the same, then separate write cycles are initiated for writing the current data and previous data variables, which itself may have been resulted from merging of a number of previous write requests. Also, the merging of the write data variables ends, if a read request becomes dependent on a pending write request.

It should be noted that even if the addresses of two consecutive write requests are the same, but one data variable is to be written into the lower 16-bit positions and the other to the upper 16-bit positions of the same memory location, separate write cycles are generated, without merging the two data variables. More specifically, in the above example, two separate write cycles are generated for writing "3" (Hex) and "5" (Hex) into memory bit positions 0–3 and 16–20, even if the corresponding write requests are directed at the same memory address. If the current data and previous data variables are, however, two 16-bit data, the VARADD register 36 concatenates them into a single 32-bit write. The DSC 20 handles 32-bit data transparently, i.e., without concatenation. A Position Valid (PV) flag in the PAWAQ 32 indicates whether the VARADD register 36 contains data or not.

In this way, 1-bit write requests may be merged to 16 successive bit positions by a single write cycle. Also, successive write requests to four adjacent nibbles may be handled by initiating a single 16-bit write cycle, and write requests to two adjacent 16-bit words may be handled by a single 32-bit write cycle. The content of the VARADD register 36 is shown in Table 4.

TABLE 4

| VARADD Contents | | | | | | | | |
|---|---|---|---|---|---|---|---|---|
| 77–76 | 75 | 74 | 73 | 72 | 71–70 | 69–38 | 37–6 | 5–0 |
| F16H,L | PV | PA | PF | DW | MPO | Data | Address | PTag |

Except for a 32-bit write, the DSC 20 issues a write cycle to partially write the merged data into the register 36. In order to write partial data into a memory location, the VARADD register 36 supplies the DSU 16 with one of two instructions: F16H and F16L, as contained in bits 77–76. The F16H and F16L instructions, which are derived based on the MPO, are used to indicate whether the write data should be written into the lower word of the addressed memory location, the upper word of the addressed location, or to the entire length of the addressed memory location. A Write Access Queue (WAQ) 38 stores all write accesses to the DSU 16. In the exemplary embodiment, the write requests are written out to a DSU 16 only when the memory bus 22 is idle, the WAQ queue 38 is full, or a read request is dependent on a pending write request. Upon decoding the bits 77–76 of the VARADD provided information, the DSU 16 writes the data in corresponding memory positions of the indicated memory address.

From the foregoing description it would be appreciated that the present invention reduces the number of times the system memory is occupied by write cycles. As a result, the available memory bandwidth is increased, thereby reducing the number of stalled cycles for subsequent read addresses.

What is claimed is:

1. A method for writing data into a system memory having addressable memory locations with corresponding memory positions comprising the steps of:

receiving data variables to be written into specified memory positions within the addressable memory locations having corresponding memory addresses;

generating mask bits corresponding to a specified memory position into which the received data variables are to be written;

generating a mask position field (MPO) defining whether a data variable should be written into a first portion or a second portion of a memory location;

merging the data variables, corresponding mask bits, and mask positioning field, unless a condition for not merging the data variables is satisfied;

decoding an instruction derived based on the MPO to determine whether the data variable should be written into a lower word of the addressed memory location, an upper word of the addressed memory location, or the entire length of the addressed memory location; and writing the merge data variables into the system memory.

2. The method of claim 1, wherein the condition for not merging the data variables is satisfied, when a memory address for a current data variable is not the same as that of a previous data variable.

3. The method of claim 1, wherein the condition for not merging the data variables is satisfied, when two successive data variables are to be written into two separate portions of the same memory location.

4. The method of claim 1, wherein the condition for not merging the data variables is satisfied, when a read request for a data variable at a memory address becomes dependent on a pending write request that writes another data variable into the same memory address.

5. The method of claim 1, wherein the data variables are merged based on a predefined bit length format and a data start position within the addressed memory location.

6. The method of claim 5, wherein based on the predefined bit length format, the data variable is written into different memory locations without being merged with another data variable.

* * * * *